United States Patent
Perr

(10) Patent No.: US 8,596,243 B2
(45) Date of Patent: Dec. 3, 2013

(54) CONICAL AIR FLOW VALVE HAVING IMPROVED FLOW CAPACITY AND CONTROL

(75) Inventor: J. Victor Perr, Greenwood, IN (US)

(73) Assignee: Cummins, Inc., Columbus, IN (US)

( * ) Notice: Subject to any disclaimer, the term of this patent is extended or adjusted under 35 U.S.C. 154(b) by 766 days.

(21) Appl. No.: 12/748,386

(22) Filed: Mar. 27, 2010

(65) Prior Publication Data

US 2011/0233436 A1 Sep. 29, 2011

(51) Int. Cl.
*F16K 5/02* (2006.01)
*F16K 11/00* (2006.01)
*F16K 27/00* (2006.01)

(52) U.S. Cl.
USPC ............ 123/337; 251/310; 137/625.42

(58) Field of Classification Search
USPC .......... 123/337, 339.21, 339.25, 568.21, 123/568.24, 568.18, 568.19; 137/625.42, 137/625.46, 625.21–625.23; 251/188, 207, 251/310, 129.11, 366
See application file for complete search history.

(56) References Cited

U.S. PATENT DOCUMENTS

| | | | |
|---|---|---|---|
| 117,853 A | 8/1871 | Allen | |
| 960,080 A | 5/1910 | Fay et al. | |
| 2,416,110 A * | 2/1947 | Mallory | 123/376 |
| 2,630,325 A | 3/1953 | Reynolds | |
| 2,646,063 A | 7/1953 | Hayes | |
| 2,728,550 A * | 12/1955 | Sinkler | 251/188 |
| 2,991,885 A | 7/1961 | Gutkowski | |
| 3,171,423 A | 3/1965 | Dillon | |
| 3,421,544 A | 1/1969 | Bozoyan | |
| 3,447,862 A | 6/1969 | Elpem | |
| 3,868,991 A | 3/1975 | Sheppard | |
| 3,877,304 A | 4/1975 | Vetsch | |
| 4,134,377 A | 1/1979 | Bamsey et al. | |
| 4,138,849 A | 2/1979 | Wilber | |
| 4,258,687 A | 3/1981 | Mauch et al. | |
| 4,445,475 A * | 5/1984 | Baumgartner et al. | 123/339.21 |
| 4,526,004 A | 7/1985 | French et al. | |
| 4,554,943 A | 11/1985 | Claney et al. | |
| 4,976,279 A | 12/1990 | King, Sr. et al. | |
| 5,067,319 A | 11/1991 | Moser | |

(Continued)

FOREIGN PATENT DOCUMENTS

| | | |
|---|---|---|
| EP | 1 426 603 A1 | 6/2004 |
| JP | 2008190337 | 8/2008 |
| WO | 2008015397 | 2/2008 |

OTHER PUBLICATIONS

International Search Report and Written Opinion, PCT/US2011/030113, Cummins Inc., ISR/US, May 14, 2011.

(Continued)

*Primary Examiner* — Hieu T Vo
(74) *Attorney, Agent, or Firm* — Krieg DeVault, LLP

(57) ABSTRACT

A conical rotary valve includes a conical valve body including a frustum of a cone and a first fluid passageway. The valve further includes a conical engagement body at least partially covering the conical valve body, where the conical engagement body comprising a second fluid passageway. The valve includes a valve actuator rotatably engaged to the conical valve body to provide a variable flow area that includes an intersecting area of the first fluid passageway and the second fluid passageway. The first fluid passageway and the second fluid passageway are structured such that a value $\delta A_f/\delta\theta_v$ is monotonically increasing, where $A_f$ is the variable flow area and $\theta_v$ is a rotational angle of the conical valve body.

24 Claims, 4 Drawing Sheets

(56) References Cited

U.S. PATENT DOCUMENTS

| | | | |
|---|---|---|---|
| 5,172,717 A | 12/1992 | Boyle et al. | |
| 5,419,685 A | 5/1995 | Fujii et al. | |
| 5,617,726 A | 4/1997 | Sheridan et al. | |
| 6,276,664 B1 * | 8/2001 | Keller | 251/69 |
| 6,527,194 B1 | 3/2003 | Burke | |
| 6,647,971 B2 | 11/2003 | Vaughan et al. | |
| 6,726,174 B2 | 4/2004 | Bareis et al. | |
| 6,976,480 B2 | 12/2005 | Miyoshi et al. | |
| 7,014,557 B2 | 3/2006 | Thomassin et al. | |
| 7,182,075 B2 | 2/2007 | Shahed et al. | |
| 7,284,544 B2 | 10/2007 | Hatano | |
| 7,357,125 B2 | 4/2008 | Kolavennu | |
| 7,363,919 B1 | 4/2008 | Styles | |
| 7,762,242 B2 | 7/2010 | Gates et al. | |
| 7,987,836 B2 | 8/2011 | Kurtz et al. | |
| 8,042,565 B2 | 10/2011 | Ball et al. | |
| 8,307,650 B2 | 11/2012 | Robinson et al. | |
| 2004/0074480 A1 | 4/2004 | Chen et al. | |
| 2005/0189343 A1 | 9/2005 | Griffin et al. | |
| 2007/0068500 A1 | 3/2007 | Joergl et al. | |
| 2007/0125081 A1 | 6/2007 | Czarnowski et al. | |
| 2007/0144170 A1 | 6/2007 | Griffith | |
| 2008/0257316 A1 | 10/2008 | Modien et al. | |
| 2010/0051001 A1 | 3/2010 | Webb et al. | |
| 2011/0232789 A1 * | 9/2011 | Perr et al. | 137/625.42 |

OTHER PUBLICATIONS

International Searching Authority. International Search Report and Written Opinion. Cummins, Inc. PCT/US2011/030111. May 27, 2011.

* cited by examiner

US 8,596,243 B2

CONICAL AIR FLOW VALVE HAVING IMPROVED FLOW CAPACITY AND CONTROL

BACKGROUND

The technical field generally relates to air flow valves for control of gaseous streams related to operations of an internal combustion engine. Internal combustion engines have various gaseous streams where control of the stream flow rate is desirable. For example, control of an exhaust gas recirculation (EGR) stream may be required to meet emissions targets and to improve engine operation and response. Presently, many available valves to control EGR have a few drawbacks. For example, a poppet valve has a very steep flow increase with opening at early opening values, and through most of the movement range the poppet valve has very little effect on the flow rate through the valve. A butterfly valve likewise provides poor controllability through a significant range of the valve movement. A rotary valve has been used that provides good controllability, but the design of the valve requires that the valve remains a significant restriction in the controlled flow stream even when fully open. Therefore, further technological developments are desirable in this area.

SUMMARY

One embodiment is a unique conical rotary valve having a variable flow area there through. Further embodiments, forms, objects, features, advantages, aspects, and benefits shall become apparent from the following description and drawings.

DESCRIPTION OF THE ILLUSTRATIVE EMBODIMENTS

Figure 1:
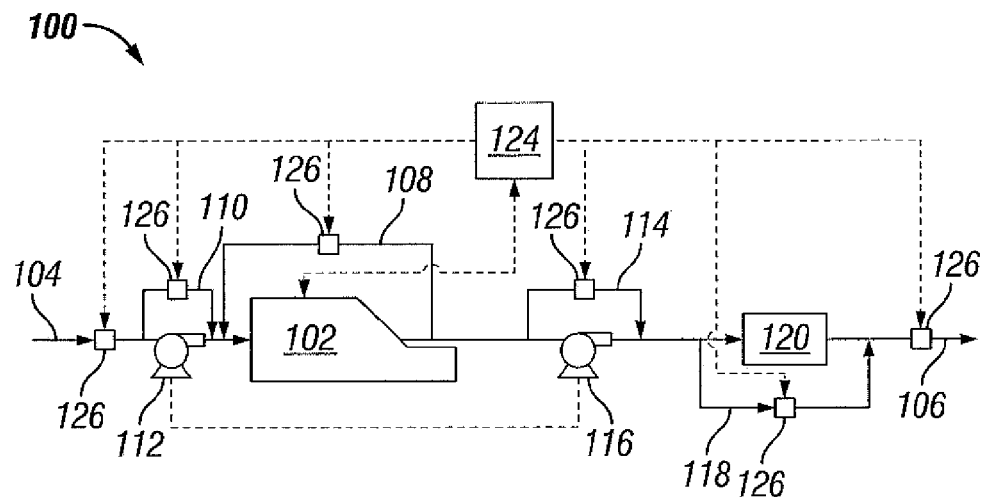
FIG. 1 is an illustrative view of a system including at least one conical rotary valve.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

FIG. 1 is a schematic diagram of a system 100 including at least one conical rotary valve 126. In the system 100, a conical rotary valve 126 is shown at each position including a valve 126 on the intake stream 104, on the EGR stream 108, on a compressor bypass stream 110, on a turbine bypass stream 114, on an aftertreatment component bypass stream 118, and on the exhaust stream 106. The illustrated positions for the conical rotary valve 126 are exemplary only, and a system 100 may have conical rotary valves 126 in positions other than those depicted in FIG. 1, and may not have some of the conical rotary valves 126 depicted. The illustrated system 100 includes a compressor 112 and a turbine 116, which are illustrated as discrete devices for a simplified illustration, but which may be housed within one physical device connected with a shaft. The illustrated system further includes an aftertreatment component 120 that may be any type of aftertreatment component known in the art, including at least one of a diesel oxidation catalyst, a $NO_x$ adsorption catalyst, a lean $NO_x$ conversion catalyst, a particlute filter, and/or a selective reduction catalyst.

Figure 2:
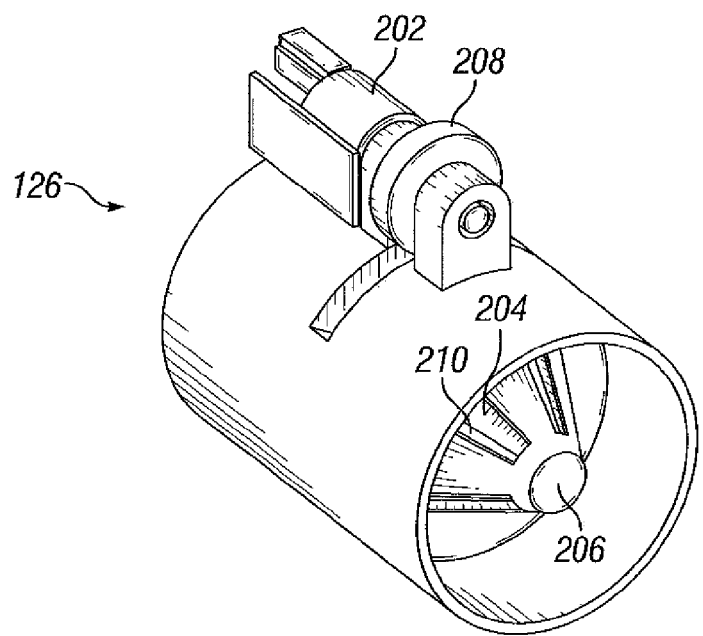
FIG. 2 is an illustrative view of a conical rotary valve having a valve actuator.

The system 100 includes an internal combustion engine 102 having a gaseous fluid stream and a conical rotary valve 126 disposed in the gaseous fluid stream. The engine gaseous fluid stream may be an engine exhaust stream 106, an engine intake stream 104, an exhaust gas recirculation (EGR) stream 110, an EGR cooler bypass stream (not shown), a compressor bypass stream 110, a turbine bypass stream 114, and/or aftertreatment component bypass stream 118. The conical rotary valve 126 has a variable flow area therethrough as a function of a rotational angle of the conical rotary valve 126. Referencing FIG. 2, the conical rotary valve 126 includes a valve actuator 202 that rotates the conical rotary valve 126 to modulate the variable flow area. The valve actuator 202 in FIG. 2 is shown as an electronic valve actuator 202, but the valve actuator 202 may be any type understood in the art including at least pneumatic and hydraulic. In certain embodiments, the valve actuator 202 engages the conical valve body 204 along an outer circumference of the conical valve body 204 (e.g. as illustrated in FIG. 3).

Figure 3:
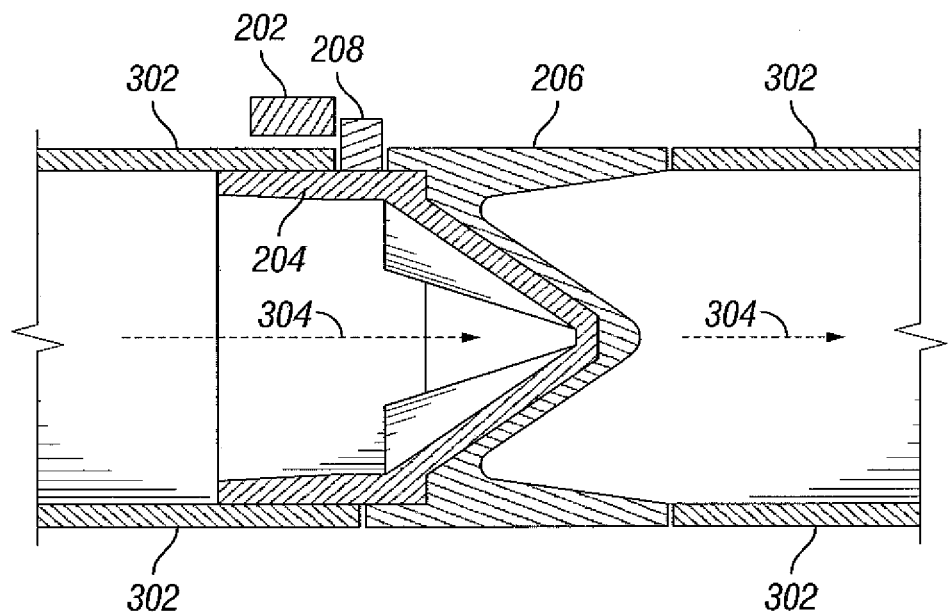
FIG. 3 is a sectional side cutaway view of a conical rotary valve.
Figure 4:
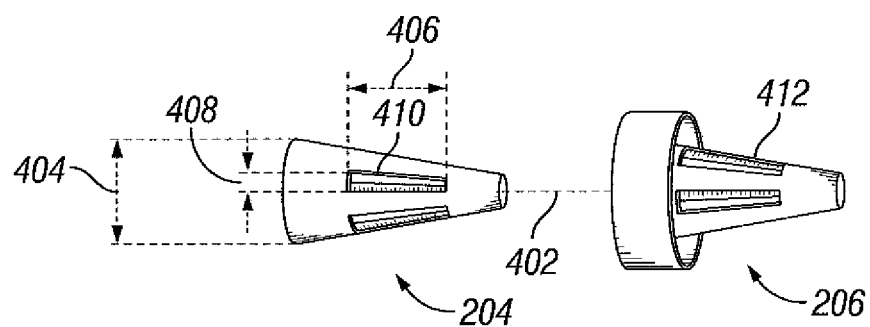
FIG. 4 is an illustrative view of a conical rotary valve having a first fluid passageway with a high aspect ratio.

Referencing FIG. 3, the conical rotary valve 126 includes a conical valve body 204 that includes at least a frustum of a cone, where the conical valve body 204 is disposed in the engine gaseous fluid stream and has a first fluid passageway 410 (reference FIG. 4). The conical rotary valve 126 further includes a conical engagement body 206 that at least partially covers the conical valve body 204 and that includes a second fluid passageway 412 (reference FIG. 4). The valve actuator 202 rotates the conical valve body 204 to provide a variable flow area 210 therethrough, where the variable flow area includes the intersecting area of the first fluid passageway 410 and the second fluid passageway 412. The conical engagement body 206 may be upstream or downstream of the conical valve body 204, and the frustum of the cone of the conical rotary valve 126 may point upstream or downstream. The conical engagement body 206 may at least partially cover the conical valve body 204 as an outer cover (as shown in FIG. 3) or as an inside cover.

Figure 5:
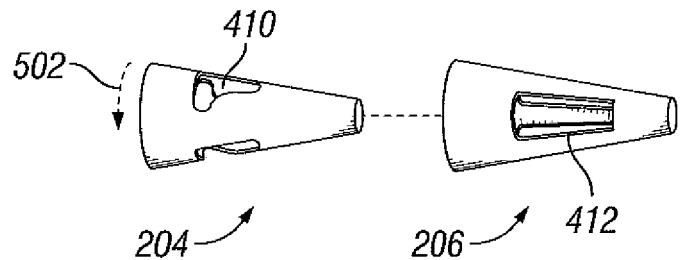
FIG. 5 is an illustrative view of a conical rotary valve having a value $\delta A_f/\delta \theta_v$ that is monotonically increasing, wherein $A_f$ is a variable flow area and $\theta_v$ is a rotational angle.
Figure 6:
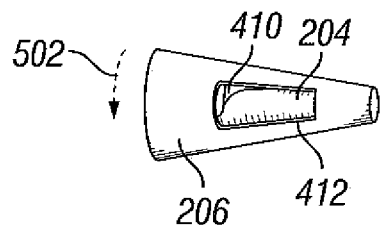
FIG. 6 is another view of the conical rotary valve illustrated in FIG. 5.

In certain embodiments, the conical rotary valve 126 has an effective flow area therethrough as a substantially linear function of the rotational angle of the conical rotary valve 126. In certain alternate or additional embodiments, the conical rotary valve 126 is structured such that a value $\delta A_f/\delta \theta_v$ that is monotonically increasing, wherein $A_f$ is the variable flow area 210 and $\theta_v$ is the rotational angle. For example, referencing FIG. 5, it is seen that the shape of the first fluid passageway 410 is such that as the conical valve body 204 rotates in the direction 502, the incremental rate of increase of the variable flow area 210 created by the intersection of the first fluid passageway 410 and the second fluid passageway 412 is increasing for all values of $\theta_v$. Referencing FIG. 6, it can be seen that an incremental rotation in the direction 502 results in an increase in the rate of change of the variable flow area 210, as the first fluid passageway 410 exposes an incrementally larger area as the conical valve body 204 rotates. In certain further embodiments, first fluid passageway 410 and the second fluid passageway 412 are structured so that $\delta A_f/\delta \theta_v$ is monotonically increasing for a portion of the values of $\theta_v$. While any portion of the rotational values are contemplated, in certain embodiments the value $\delta A_f/\delta \theta_v$ is monotonically increasing for $\theta_v$ values right after opening, or for $\theta_v$ values less than 30 degrees.

Further, one of skill in the art will appreciate that for a specific conical valve body 204 and conical engagement body 206, the first fluid passageway 410 and/or the second fluid passageway 412 can be shaped (approximately as shown) such that an effective flow area of the of the conical rotary valve 126 is substantially linear as a function of rotational angle $\theta_v$. The determination of a shape to achieve linear flow, or any other desired characteristic of the flow, can be made with empirical analysis on a particular valve or via computational fluid dynamics. The conical rotary valve 126 may be designed to be linear throughout the range of the valve, or at specific locations within the range that are desired to be linear.

Figure 7:
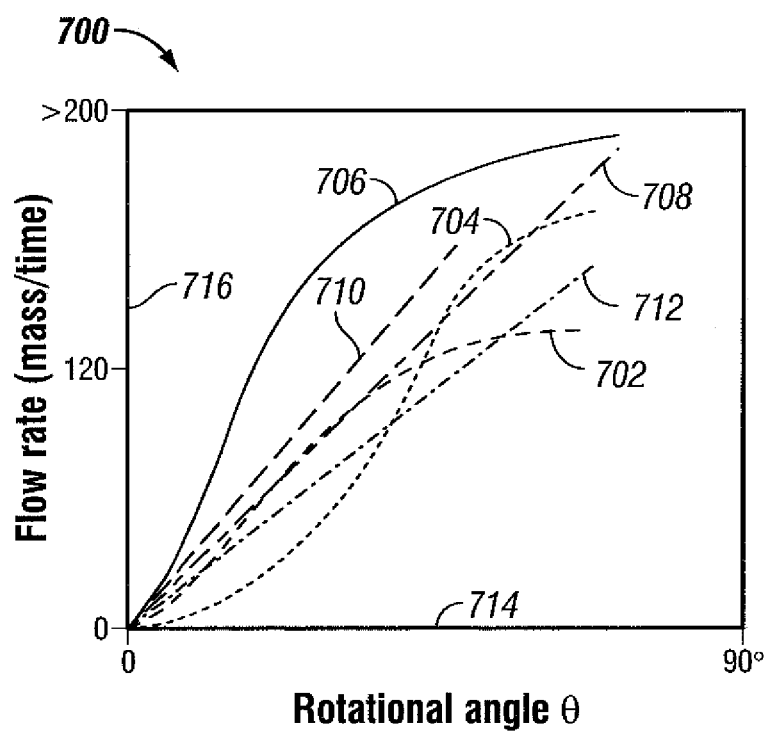
FIG. 7 is an illustration of characteristic flow behavior for several valves, including a conical rotary valve.
Figure 8:
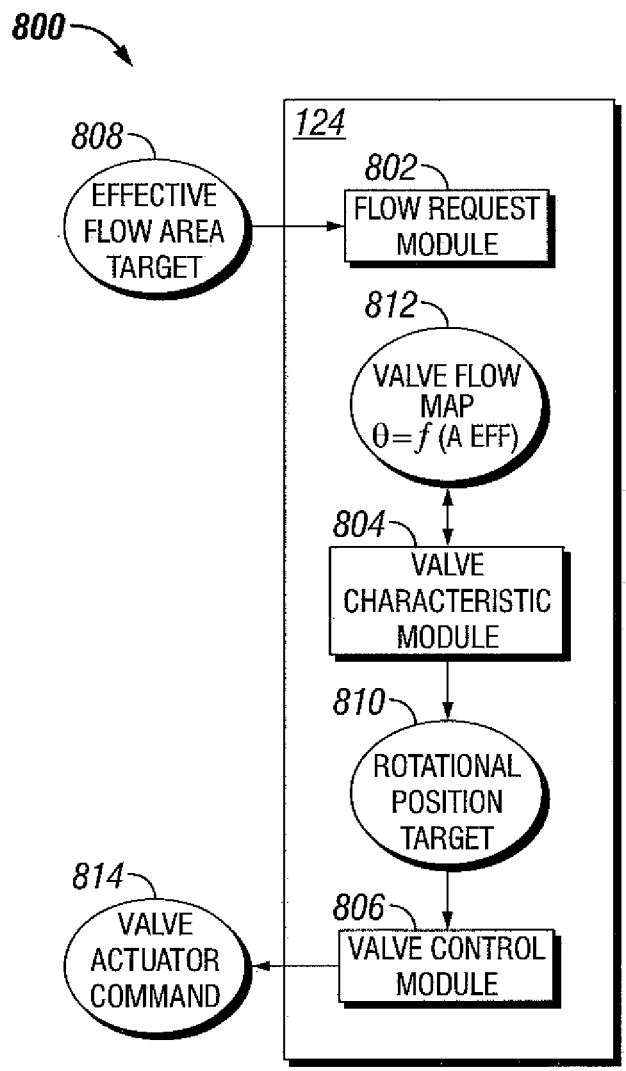
FIG. 8 is a schematic illustration of a controller for controlling flow through a valve.

Referencing FIG. 7, exemplary flow curves for a number of valves are illustrated. The curves in FIG. 7 are representative of the general flow character of the valves indicated but are not determined from actual data for a specific system. A curve 702 for a poppet valve illustrates that the position of the valve is a weak lever for the flow rate through the valve at high flow values, and that the valve does not allow high flow rates. A curve 704 for a rotary valve illustrates that flow rates as high as those observed with a butterfly valve are not achievable with a rotary valve, and that portions of the curve 704 are highly non-linear. A curve 706 for a butterfly valve allows high flow rates but includes a highly non-linear flow rate as a function of valve opening. The curve 708 illustrates one curve achievable with a conical rotary valve 126 that has shaped fluid passageways 410, 412 such that the flow rate versus rotational angle is linearized. In one example, error bands 710, 712 define a region where if the flow rate versus rotational angle falls within the error bands the conical rotary valve is considered substantially linear. The distance from the error bands 710, 712 to a linear curve 708 may be greater or less than shown according to the ease of controllability desired for the specific application. The error bands 710, 712 may be defined as absolute bands (i.e. at a specific rotational angle, within an absolute flow rate amount of a linear function) or as relative bands (i.e. at a specific rotational angle, within a percentage value of a linear function).

In certain embodiments, the fluid passageways 410, 412 are rectangular, albeit non-Euclidean rectangles as experienced on the surface of the frustum of the cone (e.g. as illustrated in FIG. 4). The conical rotary valve with rectangular fluid passageways 410, 412 exhibits a flow curve with the shape of the curve 704 for the rotary valve, except that the conical rotary valve provides a higher flow rate at full open than a flat rotary valve. The conical rotary valve can provide flow rates similar to the flow rates of a butterfly valve, and for compressible low-density fluids such as those in the gaseous streams associated with an internal combustion engine the conical rotary valve can provide flow rates even higher than the flow rate of a butterfly valve.

In certain embodiments, the first fluid passageway 410 is a slot having an aspect ratio greater than one. Referencing FIG. 4, the aspect ratio is an average length 406 along the conical valve body parallel to an axis 402 of the cone divided by an average circumferential width 408 along the conical valve body 204. In certain embodiments, the second fluid passageway 412 additionally includes an aspect ratio greater than one.

An exemplary conical rotary valve 126 includes a maximum of the variable flow area 210 being a maximum effective flow area that is at least equal to an effective flow area that would be exhibited by a flapper valve in the engine gaseous fluid stream. Another exemplary conical rotary valve 126 includes a maximum of the variable flow area such that the conical rotary valve 126 exhibits a minimum pressure drop lower than X, where $X=\Delta P_{rotary}-0.4*(\Delta P_{rotary}-\Delta P_{flap})$, where $\Delta P_{rotary}$ is a minimum pressure drop that would be exhibited by a flat rotary valve in the engine gaseous fluid stream, and where $\Delta P_{flap}$ is a minimum pressure drop that would be exhibited by a flapper valve (or butterfly valve) in the engine gaseous fluid stream for a given valve position.

For example, referencing FIG. 7, the pressure drop associated with the full-open position of the flapper valve curve 706 is lower than the pressure drop associated with the full-open position of the rotary valve curve 704. The pressure drop associated with the full-open position of the conical rotary valve 126 is, in certain embodiments, lower than the pressure drop of the rotary valve by 40% of the difference between the rotary valve and the flapper valve.

Another exemplary conical rotary valve 126 includes a maximum of the variable flow area 210 such that the conical rotary valve 126 exhibits a minimum pressure drop that is lower than 85% of a minimum pressure drop that would be exhibited by a flat rotary valve in the engine gaseous fluid stream. Empirical testing with valves having the diameter of the engine gaseous fluid stream can determine the pressure drop associated with each of the various valves, and the length of the frustum of the cone of the conical rotary valve can be extended, thereby extending the possible average length 406 along the conical valve body parallel to an axis 402 of the fluid passageways 410, 412, to reduce the pressure drop of the conical rotary valve until the desired pressure drop is achieved.

Yet another exemplary conical rotary valve 126 includes the variable flow area 210 at a fully rotated position of the conical valve body 204 such that a maximum effective flow area is at least 25% greater than an effective flow area that would be exhibited by a flat rotary valve having a diameter equivalent to a diameter of the cone 404 (reference FIG. 4). In certain embodiments the conical rotary valve 126 includes the variable flow area 210 at a fully rotated position of the conical valve body 204 such that a maximum effective flow area is at least 50% greater than an effective flow area that would be exhibited by a flat rotary valve having a diameter equivalent to a diameter of the cone 404.

The system 100 further includes a controller 124 for controlling flow through the conical rotary valve 126. The controller 124 is illustrated as a single computing device, but the controller 124 can include one or more computers, and/or hard-wired elements in hardware. The controller 124 is in communication with any sensors or actuators in the system 100 as needed to provide received information and to accept commands from the controller 124. The controller 124 may be in communication with, or included on, an engine controller.

The controller 124 includes modules that execute certain operations for controlling the flow through the conical rotary valve 126. The description herein includes the use of modules to highlight the functional independence of the features of the elements described. A module may be implemented as operations by software, hardware, or at least partially performed by a user or operator. In certain embodiments, modules represent software elements as a computer program encoded on a computer readable medium, wherein a computer performs the described operations when executing the computer program. A module may be a single device, distributed across devices, and/or a module may be grouped in whole or part with other modules or devices. The operations of any module may be performed wholly or partially in hardware, software, or by other modules. The presented organization of the modules is exemplary only, and other organizations that perform equivalent functions are contemplated herein. Modules may be implemented in hardware and/or software on computer readable medium, and modules may be distributed across various hardware or software components.

The controller 124 includes a flow request module 802 that interprets an effective flow area target 808. The effective flow area target 808 may be communicated by an engine controller, communicated over a datalink or network, and/or the controller 124 may determine the effective flow area target 808 from other parameters communicated to the controller 124. For example, the controller 124 may receive a mass flow rate request, a fluid fraction (e.g. EGR fraction) request, or other parameter from which an effective flow area target 808 may be calculated. The controller 124 further includes a valve characteristic module 804 that determines a rotational position target 810 for the conical rotary valve 126 in response to the effective flow area target 808. In certain embodiments, the valve characteristic module 804 utilizes a valve flow map 812 having a plurality of rotational angle values θ versus corresponding effective area values to determine the rotational position target 810. In alternate or additional embodiments, the valve characteristic module 804 determines the rotational position target 810 by interpolating or extrapolating from provided data points, by calculating an effective flow area from fluid dynamics equations, or by any other method understood in the art. In certain embodiments, the rotational position target 810 is a substantially linear function of the effective flow area target 808. The controller 124 further includes a valve control module 806 that provides a valve actuator command 814 in response to the rotational position target 810. The valve actuator command 814 may be an electronic command that controls the conical rotary valve 126 directly, such as an electronic signal having a specific voltage or frequency, or the valve actuator command 814 may be a communication that is provided to another portion of the system 100 to control the position of the conical rotary valve 126. Without limitation, the valve actuator command 814 may be provided to a datalink, network, or stored to a computer readable medium for later use by another computerized controller that will operate the conical rotary valve 126.

As is evident from the figures and text presented above, a variety of embodiments according to the present invention are contemplated.

One exemplary embodiment is an apparatus including a conical valve body having at least a frustum of a cone, where the conical valve body is disposed in an engine gaseous fluid stream and has a first fluid passageway. The apparatus further includes a conical engagement body at least partially covering the conical valve body and having a second fluid passageway, and a valve actuator that rotates the conical valve body to provide a variable flow area therethrough, where the variable flow area includes the intersecting area of the first fluid passageway and the second fluid passageway.

Certain embodiments of the apparatus further include features described as follows. The apparatus further includes first fluid passageway being a slot having an aspect ratio greater than one, where the aspect ratio is an average length along the conical valve body parallel to an axis of the cone divided by an average circumferential width along the conical valve body. The apparatus further includes the first fluid passageway and/or the second fluid passageway shaped such that a value $\delta A_f / \delta \theta_v$ is monotonically increasing, wherein $A_f$ is the variable flow area and $\theta_v$ is a rotational angle of the conical valve body. The apparatus further includes the first fluid passageway and/or the second fluid passageway shaped such that a value $A_{eff}$ is substantially linear with $\theta_v$, wherein $A_{eff}$ is an effective flow area of the variable flow area.

The apparatus includes a maximum of the variable flow area being a maximum effective flow area that is at least equal to an effective flow area that would be exhibited by a flapper valve in the engine gaseous fluid stream. The apparatus includes a maximum of the variable flow area exhibiting a minimum pressure drop lower than X, where $X = \Delta P_{rotary} - 0.4*(\Delta P_{rotary} - \Delta P_{flap})$, where $\Delta P_{rotary}$ is a minimum pressure drop that would be exhibited by a flat rotary valve in the engine gaseous fluid stream, and where $\Delta P_{flap}$ is a minimum pressure drop that would be exhibited by a flapper valve in the engine gaseous fluid stream.

The apparatus includes the maximum of the variable flow area exhibiting a minimum pressure drop that is lower than 85% of a minimum pressure drop that would be exhibited by a flat rotary valve in the engine gaseous fluid stream. The apparatus further includes the valve actuator engaging the conical valve body along an outer circumference of the conical valve body. The engine gaseous fluid stream an engine exhaust stream, an engine intake stream, an exhaust gas recirculation (EGR) stream, an EGR cooler bypass stream, a compressor bypass stream, a turbine bypass stream, and/or aftertreatment component bypass stream.

Another exemplary embodiment is a conical rotary valve including a conical valve body including at least a frustum of a cone and a first fluid passageway, a conical engagement body at least partially covering the conical valve body, where the conical engagement body comprising a second fluid passageway, and a valve actuator rotatably engaged to the conical valve body to provide a variable flow area that includes an intersecting area of the first fluid passageway and the second fluid passageway. The valve includes the first fluid passageway and the second fluid passageway structured so that $\delta A_f / \delta \theta_v$ is monotonically increasing for at least $\theta_v$ less than 30 degrees, where $A_f$ is the variable flow area and $\theta_v$ is a rotational angle of the conical valve body.

Certain embodiments of the conical rotary valve further include features described as follows. The conical rotary valve includes the variable flow area at a fully rotated position of the conical valve body being a maximum effective flow area that is at least equal to an effective flow area that would be exhibited by a flapper valve having a diameter equivalent to a diameter of the cone. The conical rotary valve includes the variable flow area at a fully rotated position of the conical valve body having a maximum effective flow area at least 25% greater than an effective flow area that would be exhibited by a flat rotary valve having a diameter equivalent to a diameter of the cone, and in certain embodiments having a maximum effective flow area at least 50% greater than an effective flow area that would be exhibited by a flat rotary valve having a diameter equivalent to a diameter of the cone.

The conical rotary valve further includes the first fluid passageway including a slot with an aspect ratio greater than one, where the aspect ratio includes an average length along the conical valve body parallel to an axis of the cone divided by an average circumferential width along the conical valve body. The conical rotary valve further includes the second fluid passageway including a slot having an aspect ratio greater than one, where the aspect ratio includes an average length along the conical engagement body parallel to an axis of the cone divided by an average circumferential width along the conical engagement body. The conical rotary valve includes $\delta A_f/\delta\theta_v$ being monotonically increasing for greater values of $\theta_v$, up to and including all values of $\theta_v$.

Yet another exemplary embodiment is a system including an internal combustion engine having a gaseous fluid stream, a conical rotary valve disposed in the gaseous fluid stream, where the conical rotary valve has a variable flow area therethrough as a function of a rotational angle of the conical rotary valve, and a valve actuator that rotates the conical rotary valve to modulate the variable flow area. Certain embodiments of the system further include features described as follows.

The system includes the conical rotary valve having an effective flow area therethrough as a substantially linear function of the rotational angle of the conical rotary valve, and/or a value $\delta A_f/\delta\theta_v$ that is monotonically increasing, wherein $A_f$ is the variable flow area and $\theta_v$ is the rotational angle.

The system further includes a flow request module that interprets an effective flow area target, a valve characteristic module that determines a rotational position target for the conical rotary valve in response to the effective flow area target, and a valve control module that commands the valve actuator in response to the rotational position target. The system includes the rotational position target as a substantially linear function of the effective flow area target. The system further includes a $\delta A_f/\delta\theta_v$ that is monotonically increasing, where $A_f$ is the variable flow area and $\theta_v$ is the rotational angle.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus, comprising:
   a conical valve body including a frustum of a cone, the conical valve body disposed in an engine gaseous fluid stream and having a first fluid passageway;
   a conical engagement body at least partially covering the conical valve body and having a second fluid passageway; and
   a valve actuator that rotates the conical valve body to provide a variable flow area therethrough, the variable flow area comprising an intersecting area of the first fluid passageway and the second fluid passageway.

2. The apparatus of claim 1, wherein the first fluid passageway comprises a slot having an aspect ratio greater than one.

3. The apparatus of claim 1, wherein the first fluid passageway is shaped such that a value $\delta A_f/\delta\theta_v$ is monotonically increasing, wherein $A_f$ is the variable flow area and $\theta_v$ is a rotational angle of the conical valve body.

4. The apparatus of claim 3, wherein the first fluid passageway is shaped such that a value $A_{eff}$ is substantially linear with $\theta_v$, wherein $A_{eff}$ is an effective flow area of the variable flow area.

5. The apparatus of claim 1, wherein the second fluid passageway is shaped such that a value $\delta A_f/\delta\theta_v$ is monotonically increasing, wherein $A_f$ is the variable flow area and $\theta_v$ is a rotational angle of the conical valve body.

6. The apparatus of claim 5, wherein the second fluid passageway is shaped such that a value $A_{eff}$ is substantially linear with $\theta_v$, wherein $A_{eff}$ is an effective flow area of the variable flow area.

7. The apparatus of claim 1, wherein a maximum of the variable flow area comprises a maximum effective flow area at least equal to an effective flow area that would be exhibited by a flapper valve in the engine gaseous fluid stream.

8. The apparatus of claim 1, wherein a maximum of the variable flow area exhibits a minimum pressure drop lower than X, wherein $X=\Delta P_{rotary}-0.4*(\Delta P_{rotary}-\Delta P_{flap})$, wherein $\Delta P_{rotary}$ is a minimum pressure drop that would be exhibited by a flat rotary valve in the engine gaseous fluid stream, and wherein $\Delta P_{flap}$ is a minimum pressure drop that would be exhibited by a flapper valve in the engine gaseous fluid stream.

9. The apparatus of claim 1, wherein a maximum of the variable flow area exhibits a minimum pressure drop lower than 85% of a minimum pressure drop that would be exhibited by a flat rotary valve in the engine gaseous fluid stream.

10. The apparatus of claim 1, wherein the valve actuator engages the conical valve body along an outer circumference of the conical valve body.

11. The apparatus of claim 1, wherein the engine gaseous fluid stream comprises at least one stream selected from the streams consisting of: an engine exhaust stream, an engine intake stream, an exhaust gas recirculation (EGR) stream, an EGR cooler bypass stream, a compressor bypass stream, a turbine bypass stream, and an aftertreatment component bypass stream.

12. A conical rotary valve, comprising:
    a conical valve body having a frustum of a cone and a first fluid passageway;
    a conical engagement body at least partially covering the conical valve body, the conical engagement body comprising a second fluid passageway;
    a valve actuator rotatably engaged to the conical valve body to provide a variable flow area comprising an intersecting area of the first fluid passageway and the second fluid passageway; and
    wherein the first fluid passageway and the second fluid passageway are structured such that $\delta A_f/\delta\theta_v$ is monotonically increasing for at least $\theta_v$ less than 30 degrees, wherein $A_f$ is the variable flow area and $\theta_v$ is a rotational angle of the conical valve body.

13. The conical rotary valve of claim 12, wherein the variable flow area at a fully rotated position of the conical valve body comprises a maximum effective flow area at least equal to an effective flow area that would be exhibited by a flapper valve having a diameter equivalent to a diameter of the cone.

14. The conical rotary valve of claim 12, wherein the variable flow area at a fully rotated position of the conical valve body comprises a maximum effective flow area at least 25% greater than an effective flow area that would be exhibited by a flat rotary valve having a diameter equivalent to a diameter of the cone.

15. The conical rotary valve of claim 12, wherein the variable flow area at a fully rotated position of the conical valve body comprises a maximum effective flow area at least 50% greater than an effective flow area that would be exhibited by a flat rotary valve having a diameter equivalent to a diameter of the cone.

16. The conical rotary valve of claim 12, wherein the first fluid passageway comprises a slot having an aspect ratio greater than one.

17. The conical rotary valve of claim 12, wherein the second fluid passageway comprises a slot having an aspect ratio greater than one.

18. The conical rotary valve of claim 12, wherein $\delta A_f/\delta \theta_v$ is monotonically increasing for all values of $\theta_v$.

19. A system, comprising:
   an internal combustion engine having a gaseous fluid stream;
   a conical rotary valve disposed in the gaseous fluid stream, the conical rotary valve having a variable flow area therethrough as a function of a rotational angle of the conical rotary valve; and
   a valve actuator that rotates the conical rotary valve to modulate the variable flow area.

20. The system of claim 19, the conical rotary valve comprises an effective flow area therethrough as a substantially linear function of the rotational angle of the conical rotary valve.

21. The system of claim 19, wherein a value $\delta A_f/\delta \theta_v$ is monotonically increasing, wherein $A_f$ is the variable flow area and $\theta_v$ is the rotational angle.

22. The system of claim 19, further comprising:
   a flow request module structured to interpret an effective flow area target; and
   a valve characteristic module structured to determine a rotational position target for the conical rotary valve in response to the effective flow area target; and
   a valve control module structured to command the valve actuator in response to the rotational position target.

23. The system of claim 22, wherein the rotational position target is a substantially linear function of the effective flow area target.

24. The system of claim 23, wherein a value $\delta A_f/\delta \theta_v$ is monotonically increasing, wherein $A_f$ is the variable flow area and $\theta_v$ is the rotational angle.

* * * * *